United States Patent
Jerez

(10) Patent No.: US 9,642,302 B2
(45) Date of Patent: May 9, 2017

(54) ROTARY TRIMMER APPARATUS AND RELATED ROTARY HEAD ASSEMBLY

(71) Applicant: Orlando Jerez, Kenner, LA (US)

(72) Inventor: Orlando Jerez, Kenner, LA (US)

(*) Notice: Subject to any disclaimer, the term of this patent is extended or adjusted under 35 U.S.C. 154(b) by 579 days.

(21) Appl. No.: 13/690,583

(22) Filed: Nov. 30, 2012

(65) Prior Publication Data

US 2013/0152359 A1 Jun. 20, 2013

Related U.S. Application Data

(63) Continuation-in-part of application No. 13/150,603, filed on Jun. 1, 2011, now Pat. No. 9,210,838.

(60) Provisional application No. 61/350,390, filed on Jun. 1, 2010.

(51) Int. Cl.
*A01D 34/416* (2006.01)

(52) U.S. Cl.
CPC ..... *A01D 34/4166* (2013.01); *Y10T 29/49824* (2015.01); *Y10T 279/33* (2015.01)

(58) Field of Classification Search
CPC .. A01D 34/4166; A01D 34/416; A01D 34/43; A01D 34/52; A01D 34/53; A01D 34/535; B26F 1/04
USPC ..................... 279/141, 79; 29/426.6; 56/255, 56/294–295, 12.5, 12.7; 403/326–328, 403/59, 60, 322.1
See application file for complete search history.

(56) References Cited

U.S. PATENT DOCUMENTS

| | | | |
|---|---|---|---|
| 2,476,858 A * | 7/1949 | Graham | ........................ 33/562 |
| 2,850,862 A * | 9/1958 | Asbury | ............... A01D 34/736 30/347 |
| 3,129,771 A | 4/1964 | Lidstone | |
| 3,831,271 A | 8/1974 | Pedler | |
| 4,062,114 A | 12/1977 | Luick | |
| 4,190,954 A | 3/1980 | Walto | |
| 4,242,794 A | 1/1981 | Peterson | |
| 4,268,964 A | 5/1981 | Moore | |
| 4,286,675 A | 9/1981 | Tuggle | |
| 4,374,465 A | 2/1983 | Comer | |
| 4,501,332 A | 2/1985 | Straayer | |
| 4,513,563 A | 4/1985 | Roser et al. | |
| 4,856,194 A | 8/1989 | Lee | |
| 4,862,682 A | 9/1989 | Wait et al. | |
| 4,905,465 A | 3/1990 | Jones et al. | |
| 4,962,630 A | 10/1990 | Jones | |
| 5,023,998 A | 6/1991 | Masciarella et al. | |
| 5,092,112 A | 3/1992 | Buckendorf, Jr. | |
| 5,197,264 A | 3/1993 | Lacey | |
| 5,303,476 A | 4/1994 | Tuggle | |
| 5,345,788 A | 9/1994 | Jerry | |
| 5,361,570 A | 11/1994 | Bernardy | |

(Continued)

FOREIGN PATENT DOCUMENTS

WO WO 2006060483 A2 6/2006

*Primary Examiner* — Stephen Choi
*Assistant Examiner* — Fernando Ayala
(74) *Attorney, Agent, or Firm* — Norton IP Law Firm; Taylor M. Norton

(57) ABSTRACT

An apparatus and method are provided for removing a retained member from a rotary head assembly configured for attachment to a rotary power source. The rotary head assembly can be configured to permit quick and easy trimmer line insertion in order to resume operation of the apparatus as well as simple and efficient trimmer line removal when changing trimmer line.

14 Claims, 13 Drawing Sheets

(56) References Cited

U.S. PATENT DOCUMENTS

| | | |
|---|---|---|
| 5,426,852 A | 6/1995 | Macomber |
| 5,430,943 A * | 7/1995 | Lee .................................. 30/347 |
| 5,489,889 A | 2/1996 | Kamboruis et al. |
| 5,491,963 A | 2/1996 | Jerez |
| 5,493,783 A | 2/1996 | Oostendorp |
| 5,615,543 A | 4/1997 | Caffey et al. |
| 5,617,636 A | 4/1997 | Taggett et al. |
| 5,622,035 A | 4/1997 | Kondo et al. |
| 5,651,418 A | 7/1997 | Jerez |
| 5,683,214 A * | 11/1997 | Jeffreys ........................... 410/77 |
| 5,722,172 A | 3/1998 | Walden |
| 5,758,424 A | 6/1998 | Iacona et al. |
| 5,761,892 A | 6/1998 | Quiroga |
| 5,791,054 A * | 8/1998 | Bessinger ....................... 30/276 |
| 5,862,655 A | 1/1999 | Altamirano et al. |
| 5,881,464 A | 3/1999 | Collins et al. |
| 5,887,348 A | 3/1999 | Iacona et al. |
| 5,896,666 A | 4/1999 | Iacona et al. |
| 5,930,902 A * | 8/1999 | Hsu ................................. 30/331 |
| 5,970,693 A | 10/1999 | Ciaglo |
| 5,979,064 A | 11/1999 | Kitz et al. |
| 6,038,842 A | 3/2000 | Quiroga |
| 6,052,974 A | 4/2000 | Harb |
| 6,094,825 A | 8/2000 | Hinson |
| 6,108,914 A | 8/2000 | Sheldon |
| 6,161,244 A * | 12/2000 | Jeannet et al. ................. 15/167.1 |
| 6,185,916 B1 | 2/2001 | Johnson |
| 6,240,643 B1 | 6/2001 | Civalleri |
| 6,247,539 B1 | 6/2001 | Jerez |
| 6,357,214 B1 | 3/2002 | Iacona |
| 6,374,585 B1 | 4/2002 | Legrand |
| 6,401,344 B1 * | 6/2002 | Moore et al. ................... 30/347 |
| 6,457,242 B1 | 10/2002 | Fogle |
| D465,975 S | 11/2002 | Iacona |
| 6,519,857 B1 * | 2/2003 | Proulx et al. ................... 30/276 |
| 6,594,907 B2 | 7/2003 | Wilson et al. |
| D479,961 S | 9/2003 | Iacona |
| 6,643,938 B2 | 11/2003 | Livingston |
| 6,715,270 B1 | 4/2004 | Yandle, II |
| 6,722,040 B2 | 4/2004 | Sullivan |
| 6,735,874 B2 | 5/2004 | Iacona |
| D496,840 S | 10/2004 | Iacona |
| 6,827,152 B2 | 12/2004 | Iacona |
| 6,854,187 B2 * | 2/2005 | Huan ............................... 30/392 |
| D532,263 S | 11/2006 | Iacona |
| 7,257,898 B2 | 8/2007 | Iacona |
| 7,603,782 B2 * | 10/2009 | Jerez ............................... 30/276 |
| 7,743,511 B2 | 6/2010 | Jerez |
| 7,913,401 B2 * | 3/2011 | Iacona ........................ 30/275.4 |
| 2002/0073556 A1 | 6/2002 | Fogle |
| 2003/0037442 A1 | 2/2003 | Lyon |
| 2003/0155137 A1 | 8/2003 | Iacona |
| 2003/0226261 A1 | 12/2003 | Iacona |
| 2004/0194324 A1 * | 10/2004 | Youn-Chyuan ................. 30/337 |
| 2005/0229402 A1 | 10/2005 | Iacona |
| 2005/0257940 A1 | 11/2005 | Jerez |
| 2006/0112568 A1 | 6/2006 | Jerez |
| 2007/0028458 A1 * | 2/2007 | Guerra ............................ 30/276 |
| 2007/0130781 A1 | 6/2007 | Iacona |
| 2008/0010836 A1 | 1/2008 | Iacona |
| 2008/0116218 A1 | 5/2008 | Iacona |
| 2008/0168664 A1 | 7/2008 | Iacona |
| 2009/0038163 A1 | 2/2009 | Jerez |
| 2011/0289785 A1 | 12/2011 | Jerez |
| 2012/0087722 A1 * | 4/2012 | Lin et al. ....................... 403/327 |
| 2014/0202009 A1 * | 7/2014 | Proulx ............................ 30/333 |

* cited by examiner

SECTION A-A'

ROTARY TRIMMER APPARATUS AND RELATED ROTARY HEAD ASSEMBLY

REFERENCE TO RELATED APPLICATIONS

This is a continuation-in-part of co-pending and commonly owned U.S. patent application Ser. No. 13/150,603, filed on Jun. 1, 2011, which in turn claims the benefit of the priority of commonly owned U.S. Provisional Patent Appln. No. 61/350,390, filed on Jun. 1, 2010. The disclosures of each of the foregoing are incorporated herein by reference.

TECHNICAL FIELD

This invention relates to rotary trimmer apparatuses, and more specifically, to rotary head assemblies from which extend one or more detachable retained members which in some way act upon the surrounding environment during rotation with their respective rotary trimmer head assembly.

BACKGROUND

Presently, there are trimming apparatuses known in the art having a rotatable, attachable head for attachment to a powered device, with the head carrying a series of trimmer lines extending axially out about the periphery of the head. Examples of such weed trimming apparatuses include spool and "bump 'n' feed" weed trimming apparatuses with continuous-feed trimming line and trimming apparatuses using fixed-length pieces of trimming line. However, current weed trimming apparatuses have certain drawbacks which have gone largely unaddressed in this technical field. Some weed trimming apparatuses require extensive time to change trimmer line, while others may require tools to take apart the head of the trimming apparatus to change the trimmer line.

SUMMARY OF THE INVENTION

From the foregoing, it is apparent there is still a great and long-felt need for a weed trimmer apparatus that provides quick and easy trimmer line insertion in order to resume operation as well as simple and efficient trimmer line removal when changing trimmer line. The present invention addresses the foregoing need, amongst other needs, in a highly unique and facile way. Thus, in one aspect, the present invention provides a novel weed trimmer apparatus, particularly a rotary head assembly from which trimmer line may extend. Particularly, in at least one of its aspects, this invention provides quick and easy trimmer line insertion in order to resume operation of the trimmer apparatus. In another aspect, the invention also facilitates removal of trimmer line during change out, so that there is no need to disassemble the head of the trimmer apparatus, as required in other known trimmer apparatuses. Therefore, no tools are needed for trimmer line removal and replacement.

An aspect of this invention is an apparatus comprising a rotary head assembly configured for attachment to a rotary power source. The rotary head assembly comprises a rotary head housing defining one or more slots, each of the slots being intersected by at least a portion of a respective retention member chamber defined by the rotary head housing, and each of the slots being sized and configured to receive a respective retained member. The rotary head assembly further comprises a first face and a second face, wherein the first face and the respective retention member chamber define a respective first face aperture. Additionally, the rotary head assembly comprises one or more retention members, each comprising a first retention member portion and a second retention member portion, wherein the second retention member portion is sized and configured such that at least a portion of the second retention member portion may be disposed within a respective retention member chamber. Further, the rotary head assembly comprises one or more biasing members. Each biasing member and a respective one of the retention members is coupled to the rotary head housing and each biasing member biases the respective retention member so that (i) the first retention member portion extends through the respective first face aperture and is external of the respective retention member chamber such that the first retention member portion is accessible to manipulation by an actuating external force and (ii) the second retention member portion thereof in the respective retention member chamber intersects and extends through the respective slot, thereby retaining a portion of the retained member within the respective slot. Each retention member and respective biasing member are sized and configured so that, when the actuating external force is applied to the first retention member portion, the retention member is actuated causing the bias of the biasing member to be overcome and the second retention member portion to be removed from the respective slot, thereby releasing the respective retained member from the respective slot.

Another aspect of this invention is a method for removing one or more retained members from a rotary head assembly configured for attachment to a rotary power source and comprising a rotary head housing defining one or more slots each being sized and configured to receive a respective one of the retained members and being intersected by at least a portion of a retention member chamber defined by the rotary head housing. The method comprises applying an actuating external force to a first retention member end portion of a retention member. The first retention member end portion and at least a portion of a second retention member portion of the retention member is biased by at least one biasing member prior to application of the actuating external force such that the first retention member end portion is external to the retention member chamber and the second retention member portion retains the retained member in the slot, wherein upon application of the actuating external force, the bias of the biasing member is overcome. The method further comprises removing the second retention member portion from the slot, and removing the retained member from the rotary head assembly.

These and other features of several aspects of this invention will be still further apparent from the ensuing description, drawings, and appended claims.

BRIEF DESCRIPTION OF THE DRAWINGS

In each of the above figures, like letters or numerals are used to refer to like or functionally like parts amongst the several figures.

FURTHER DETAILED DESCRIPTION OF THE INVENTION

Illustrative implementations of the invention are described below as they might be employed in the construction and use of a rotary trimmer apparatus and related method according to at least one implementation of the present invention. It will be of course appreciated that in the development of such an actual implementation, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. In the detailed description below, general discussion of alternative steps, configurations, features and/or components may employ reference to numbered components identified in the accompanying figures. However, it should be appreciated that, unless otherwise explicitly noted, such alternative steps, configurations, features and/or components are not necessarily limited to the particular aspect illustrated in the relevant figures, as the use of such number references in this context is merely for the sake of clarity.

Turning now to the Figures, several illustrative aspects of the apparatus of the present invention are shown. Looking now at FIG. 1, an apparatus comprising a rotary head assembly 10 configured for attachment to a rotary power source (not shown) is shown. The rotary power source may be, for example, any gas-powered or electric motor found on any standard commercial weed trimming device, typically referred to as a "weedeater." The rotary head assembly 10 is sized and configured for attachment to such commercially known weed trimming devices through the use of an attachment member such as a bolt or threaded screw (not shown) through the central member aperture 12 defined by the central member 14 of the rotary head assembly.

Figure 1:
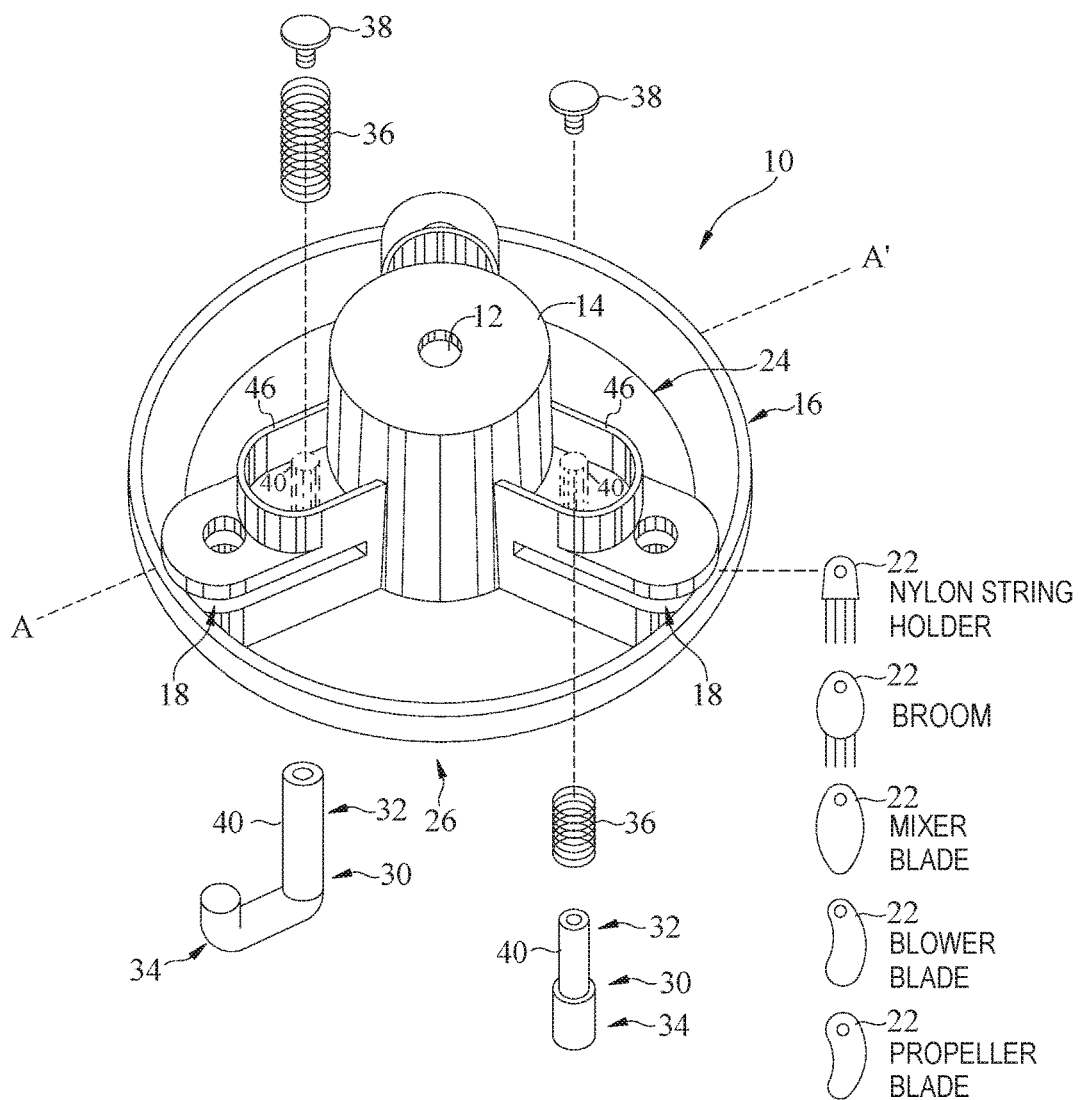
FIG. 1 is a perspective and exploded view of the rotary head assembly, retention members, and retained members consistent with one aspect of the present invention.
Figure 2:
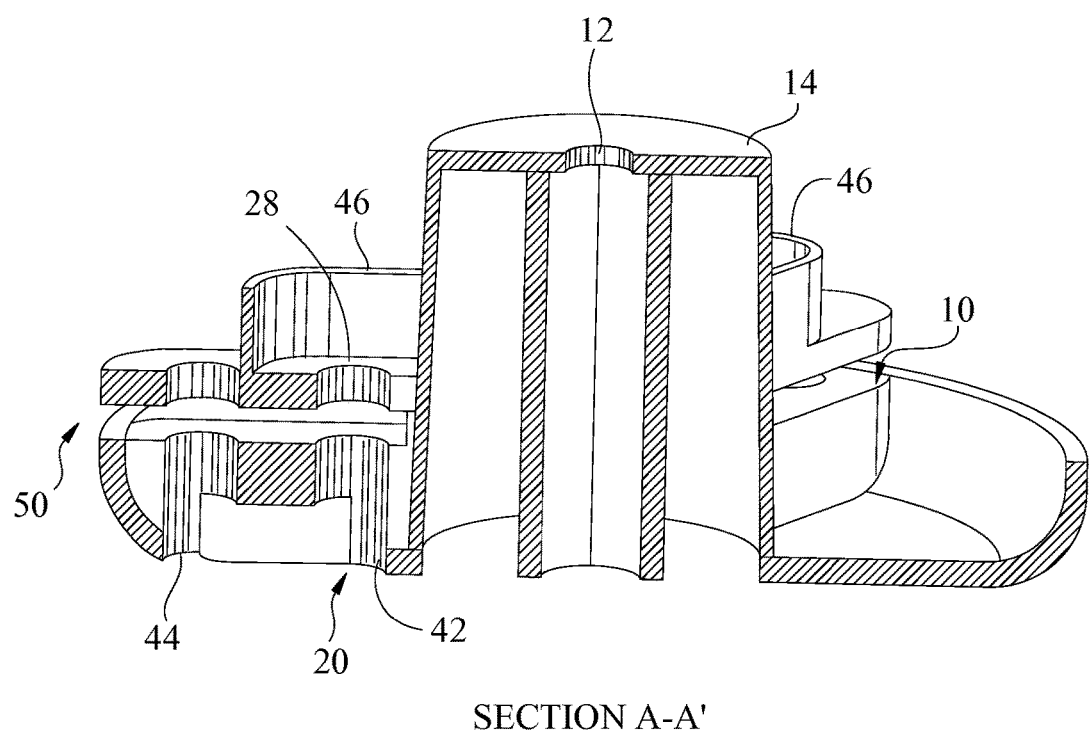
FIG. 2 is a cross-sectional view of the rotary head assembly of FIG. 1.

The rotary head assembly 10, as illustrated in FIGS. 1 and 2, comprises a rotary head housing 16 defining one or more slots 18, each of the slots being intersected by at least a portion of a respective retention member chamber 20 defined by the rotary head housing, and each of the slots being sized and configured to receive a respective retained member 22, which will be further discussed below. The rotary head assembly 10 includes a first face 24 and a second face 26, wherein the first face and the respective retention member chamber define a respective first face aperture 28. The second face opposes the first face of the rotary head assembly. It should be apparent from the ensuing disclosure that the first face may face the power source facing side of the trimmer or the first face may face the ground facing side of the trimmer, whereas the second face will be the opposing face of the rotary head assembly.

The rotary head assembly 10 further comprises one or more retention members 30, illustrated in FIG. 1 to be shaped, metal extended J or T-shaped members. Each retention member 30 includes a first retention member portion 32 and a second retention member portion 34, wherein the second retention member portion is sized and configured such that at least a portion of the second retention member portion may be disposed within a respective retention member chamber 20. As shown most clearly in FIG. 2, the retention member chamber 20 is sized and configured to receive at least a portion of the retention member 30. The retention member chamber may be configured based on the size and configuration of the retention member. As shown in FIGS. 1 and 2, the retention member 30 may be J-shaped or may be T-shaped, wherein the diameter of the second retention member portion 34 is larger than the diameter of the first retention member portion 32 when the retention member is T-shaped. The J or T-shaped members should preferably be fabricated from a rigid material, e.g., a metal or metal alloy, to reduce the possibility of breakage.

The rotary head assembly 10 further comprises one or more biasing members 36, each biasing member and a respective one of the retention members 30 being coupled to the rotary head housing 16 as shown in the exploded view of FIG. 1. The first retention member portion 32 includes a first retention member head portion 38 sized and configured to be coupled to a first retention member shaft portion 40. As shown in FIG. 1, the biasing member, illustrated as a spring 36 in this aspect, is disposed around the first retention member shaft portion 40 such that the first retention member shaft portion extends through the inner bore of the spring and through a portion of the retention member chamber 20 and additionally through the first face aperture 28. The first retention member head portion 38 is then threaded onto the first retention member shaft portion 40, thereby coupling the spring 36 and the retention member 30 to the rotary head assembly 10. Each spring 36 biases the respective retention member 30 so that (i) the first retention member portion 32 extends through the respective first face aperture 28 and is external of the respective retention member chamber 20 such that the first retention member portion is accessible to manipulation by an actuating external force and (ii) the second retention member portion 34 thereof in the respective retention member chamber intersects and extends through the respective slot 18, thereby retaining a portion of the retained member 22 within the respective slot.

As shown in FIG. 1, the retention member 30 may form various configurations. As illustrated, the retention member 30 may be J-shaped, wherein the retention member forms a J-shaped retention member, the straight portion of the retention member forming the first retention member portion 32 and at least a portion of the curved portion of the J-shaped retention member forming the second retention member portion 34. The cross-sectional view of the second retention member portion may be square-shaped. Optionally, the retention member may form a T-shape, wherein the diameter of the second retention member portion is greater than the diameter of the first retention member shaft portion. The first retention member head portion may form various shapes and configurations, wherein the first retention member head portion is sized and configured to retain the spring around the shaft portion of the first retention member portion in order to couple the spring and retention member to the rotary head assembly.

Each retention member and respective spring are sized and configured so that, when the actuating external force is applied to the first retention member portion, the retention member is actuated causing the bias of the spring to be overcome and the second retention member portion to be removed from the respective slot, thereby releasing the respective retained member from the respective slot. The actuating force typically may be applied by the operator of the trimmer device by pushing down on the first retention member head portion or by pulling on the first retention member head portion depending on the orientation of the retention member and spring.

As shown in FIGS. 1 and 2, the retention member chamber 20 defined by the rotary head housing 16 comprises a first retention member chamber portion 42 and a second retention member chamber portion 44 and the rotary head housing further defines a sidewall 46 at least semi-encircling the first face aperture 28, a top portion of the sidewall extending further from the first face 24 than the first retention member portion 32 when biased by the spring 36. The sidewall 46 is capable of functioning as a guard against unintentional force applied to the first retention head portion 38, particularly when the first retention member head portion 38 is disposed on the ground side facing portion of the rotary head assembly 10. In such an aspect, the sidewall 46 prevents inadvertent contact with the first retention member head portion 38 when the rotary head assembly 10 contacts the surface or obstruction on or near the ground surface.

Figure 3:
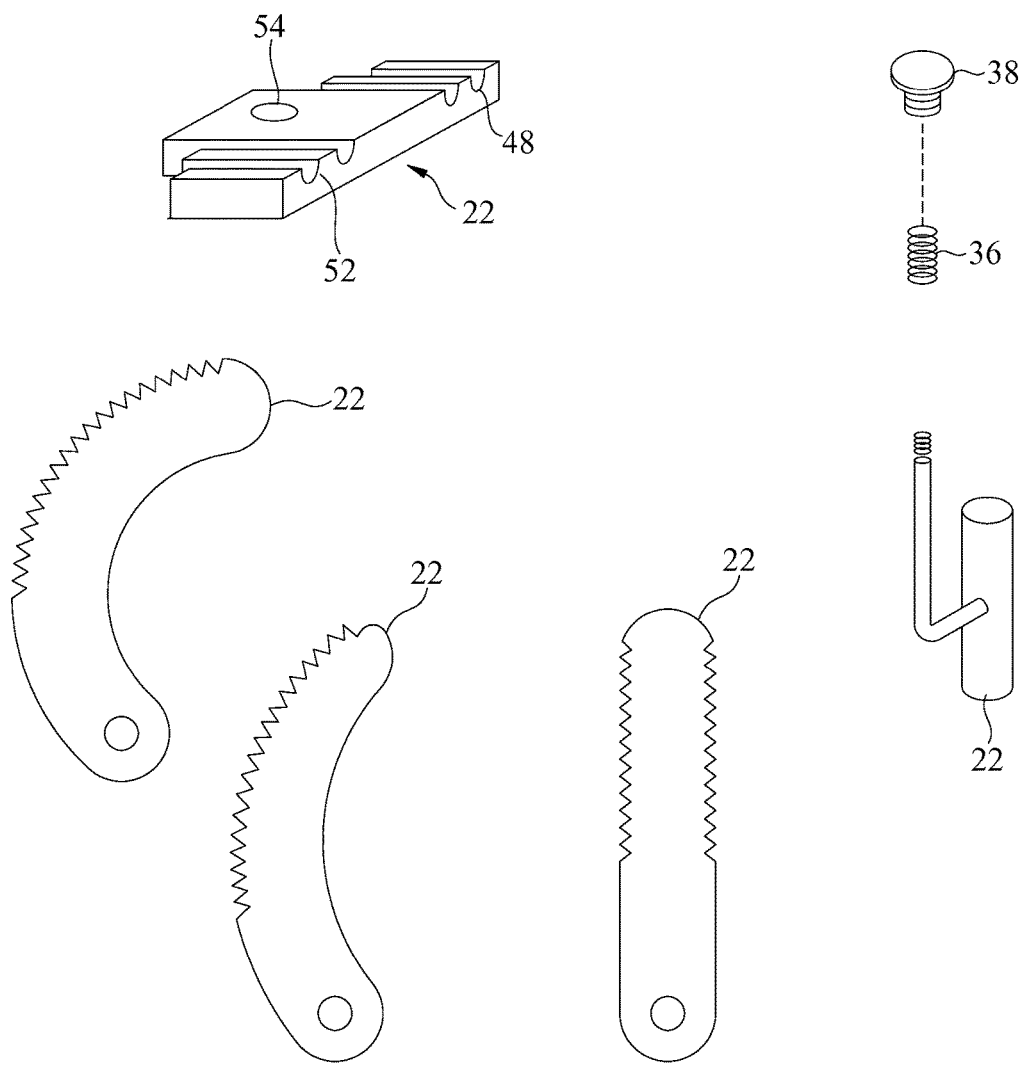
FIG. 3 is a perspective view of multiple retained members consistent with another aspect of the present invention.
Figure 4:
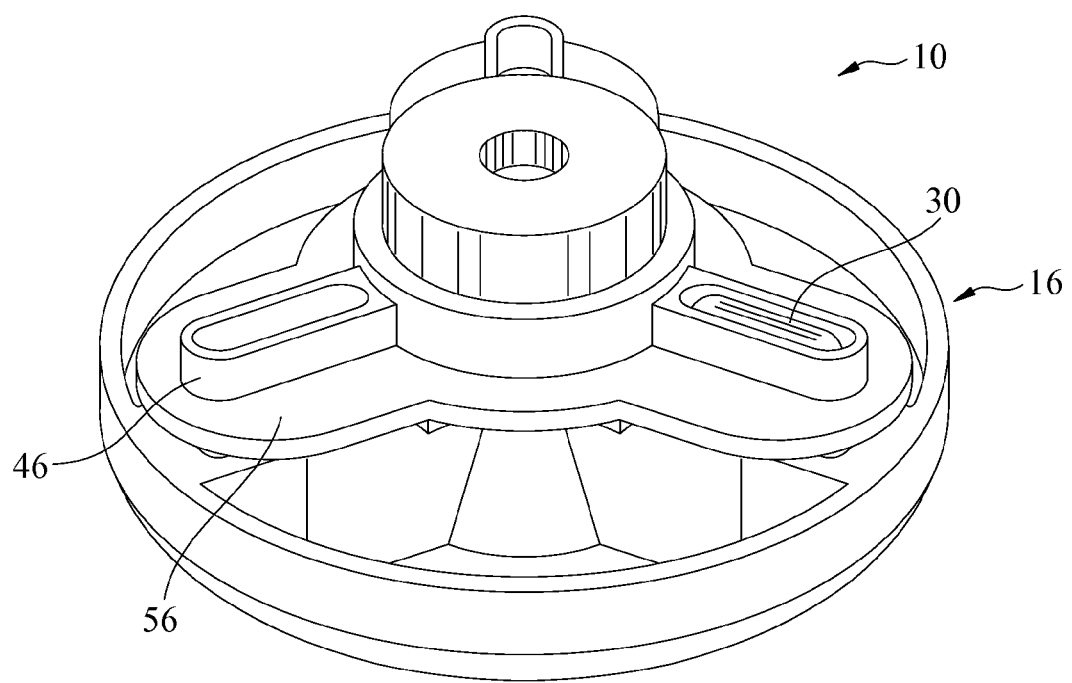
FIG. 4 is a perspective view of the rotary head assembly and retained members consistent with another aspect of the present invention.
Figure 5:
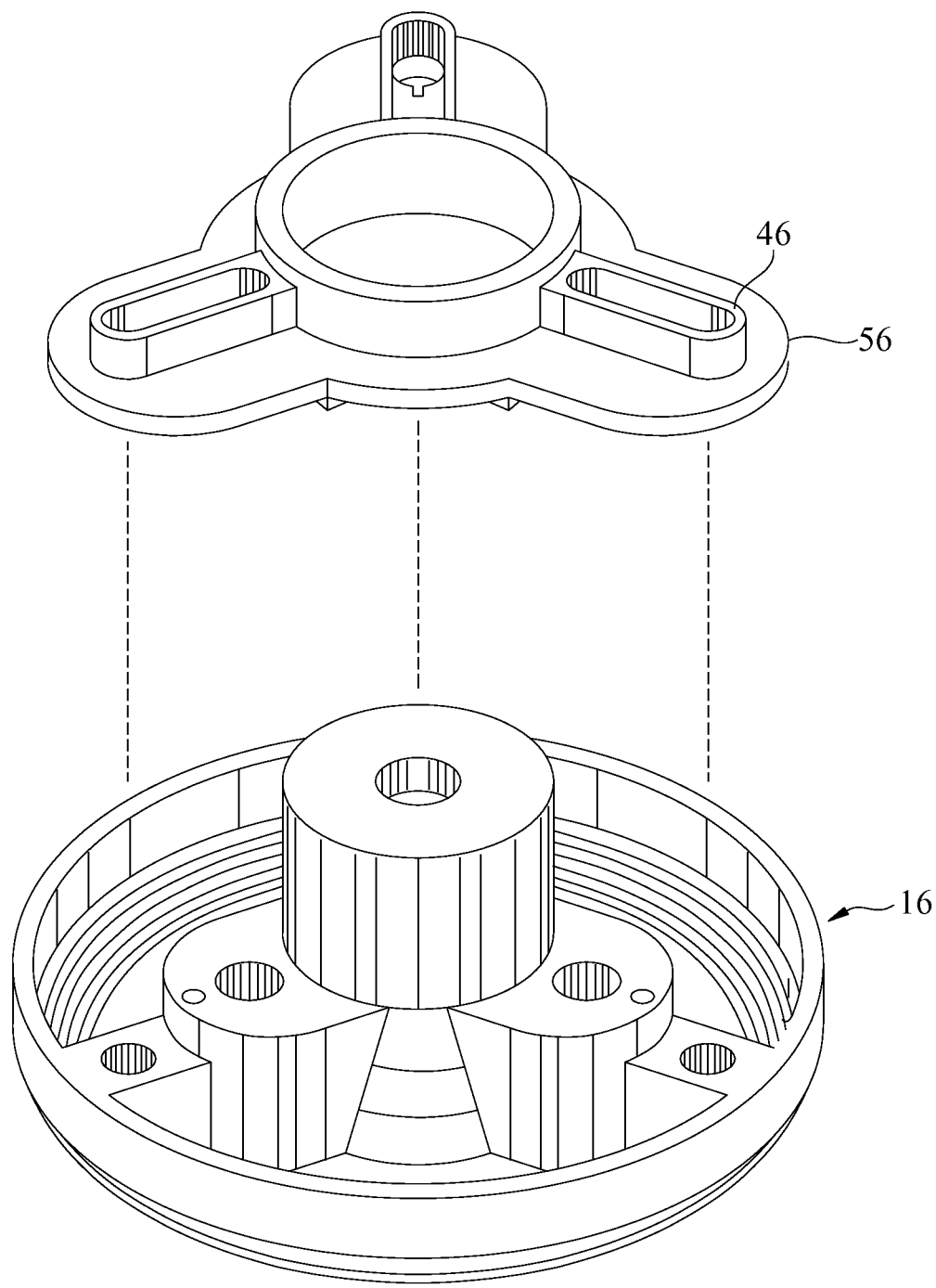
FIG. 5 is an exploded view of the rotary head assembly of FIG. 4.
Figure 6:
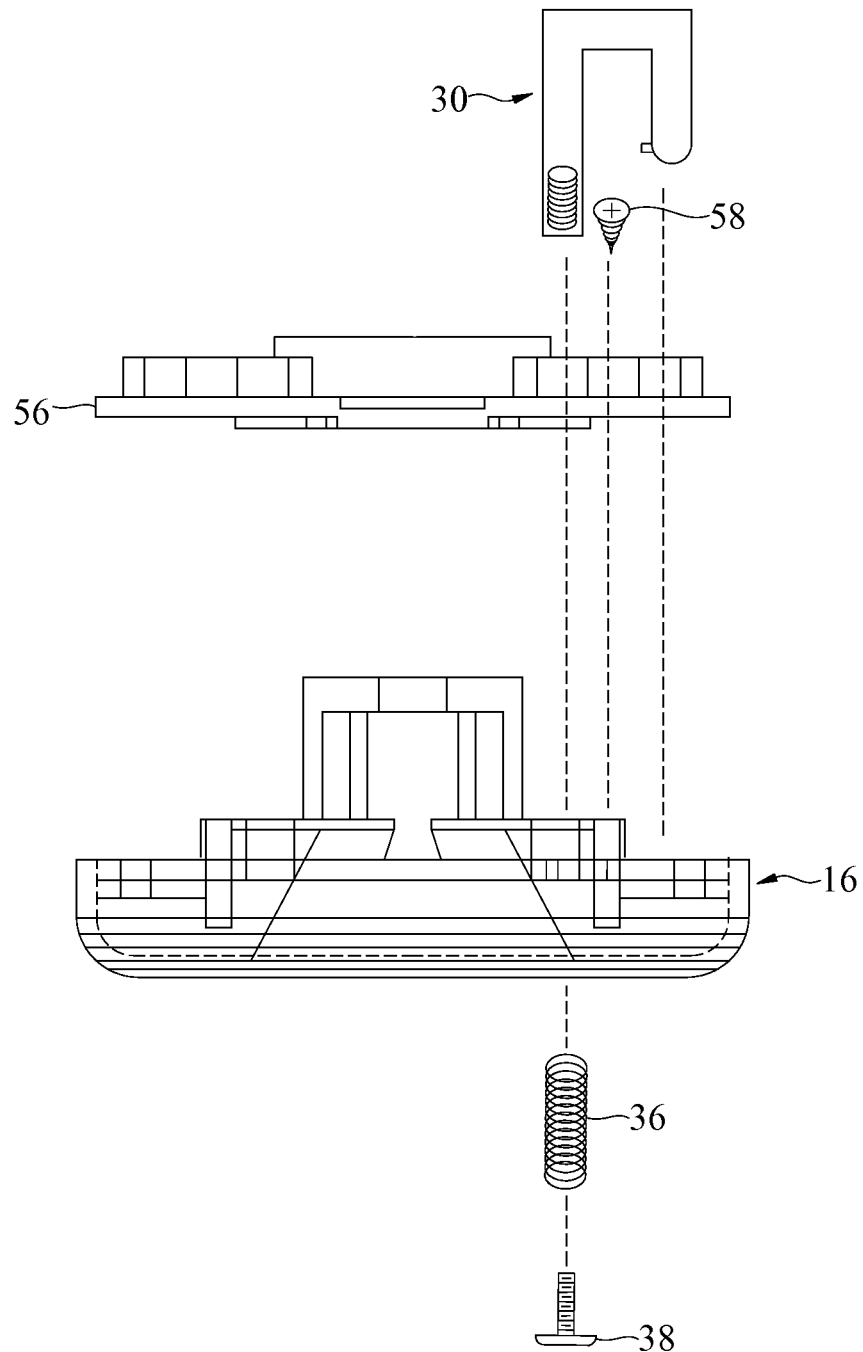
FIG. 6 is a side view of the rotary head assembly of FIG. 4.
Figure 7:
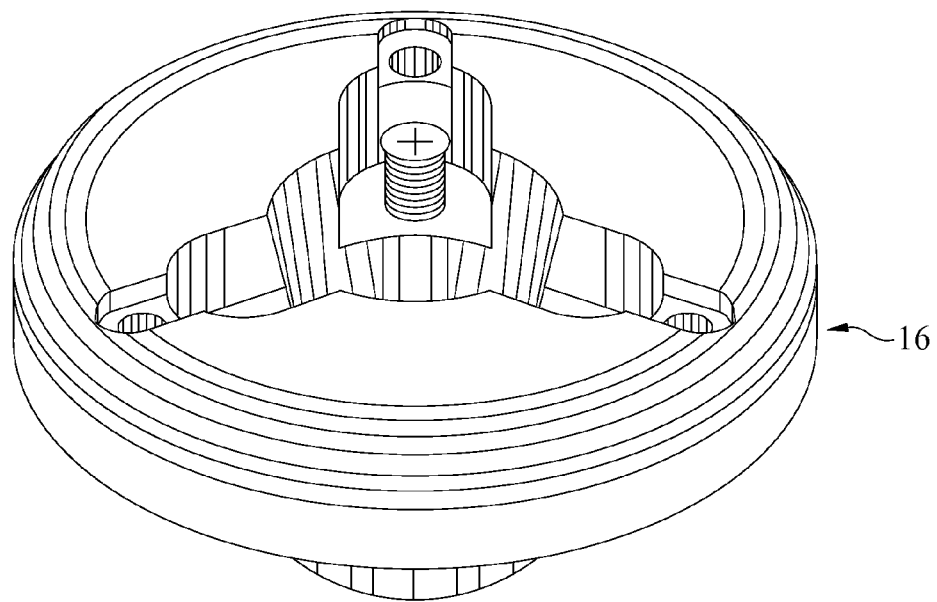
FIG. 7 is a bottom perspective view of the rotary head assembly of FIG. 4.

As illustrated in FIG. 1 and previously mentioned, the rotary head assembly 10 includes at least one slot 18 sized and configured to receive a retained member 22. The retained member may include, for example, a trimmer line holder, a broom apparatus, a mixer blade, a blower blade, or a propeller blade. Optionally, the retained member is a trimmer line, wherein the trimmer line is inserted into the respective slot and wrapped around and retained by the retention member, the end portions of the trimmer line extending distally from the respective slot. In an additional aspect of the invention illustrated in FIG. 3, the trimmer line holder 22 defines one or more recesses 48 and a respective slot opening 50, wherein the trimmer line holder comprises a hook member 52 disposed within the respective recess, the hook member capable of retaining a trimmer line (not shown) when the trimmer line as folded is wrapped around the hook member and the remainder of the trimmer line extending through the respective slot opening and distally from the trimmer line holder. The retained member 22 further defines a retained member aperture 54 sized and configured to accept the second retention member portion 34 therethrough, such that the retained member 22 is retained by the retention member 30.

Another aspect of the invention is illustrated in FIGS. 4-7, wherein the rotary head assembly 10 includes a detachably attachable cover member 56. The cover member 56 defines sidewalls 46 partially enclosing at least a portion of the retention member 30. The cover member 56 is detachably attached by three threaded members 58, illustrated as screws. Other fastening devices may be used to attach the cover member to the rotary head assembly within the spirit and scope of the invention.

Figure 8:
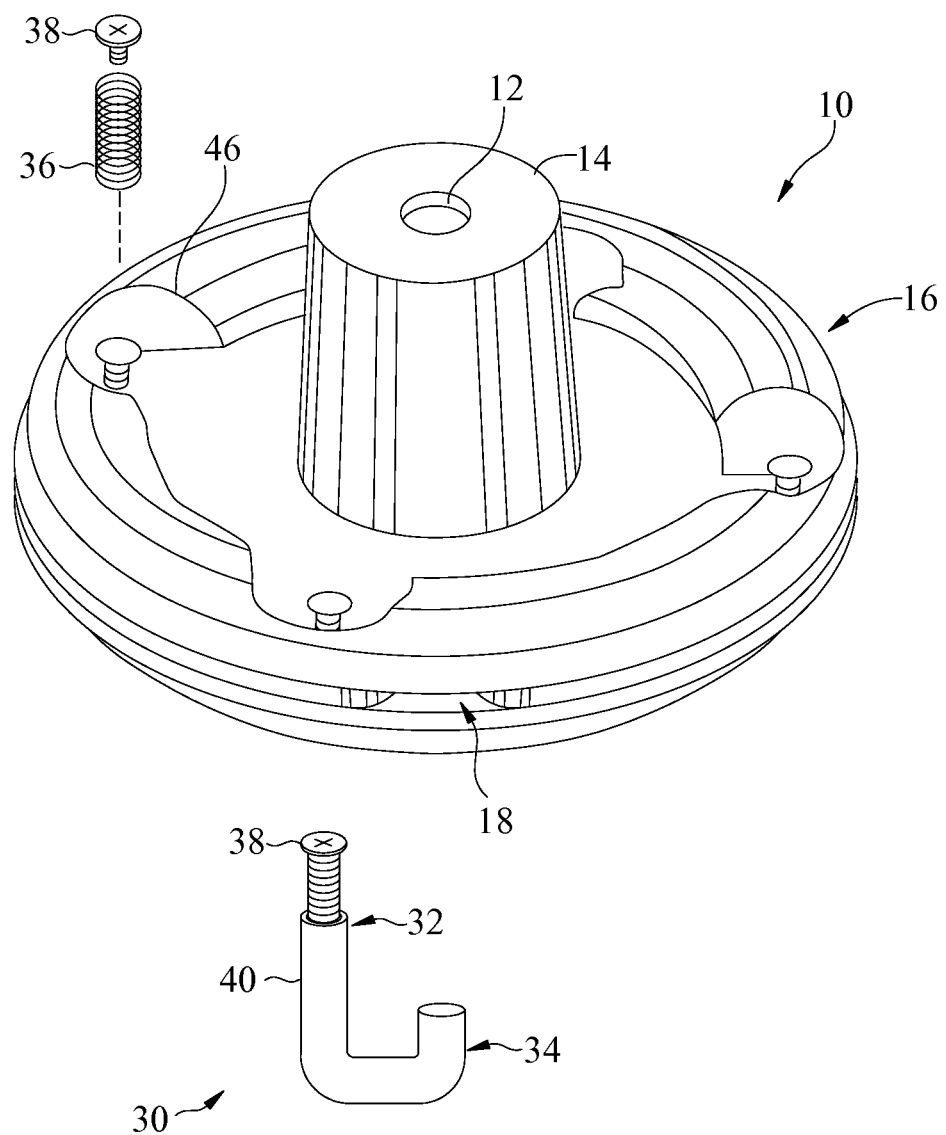
FIG. 8 is a perspective and exploded view of the rotary head assembly and retention members consistent with another aspect of the present invention.
Figure 9:
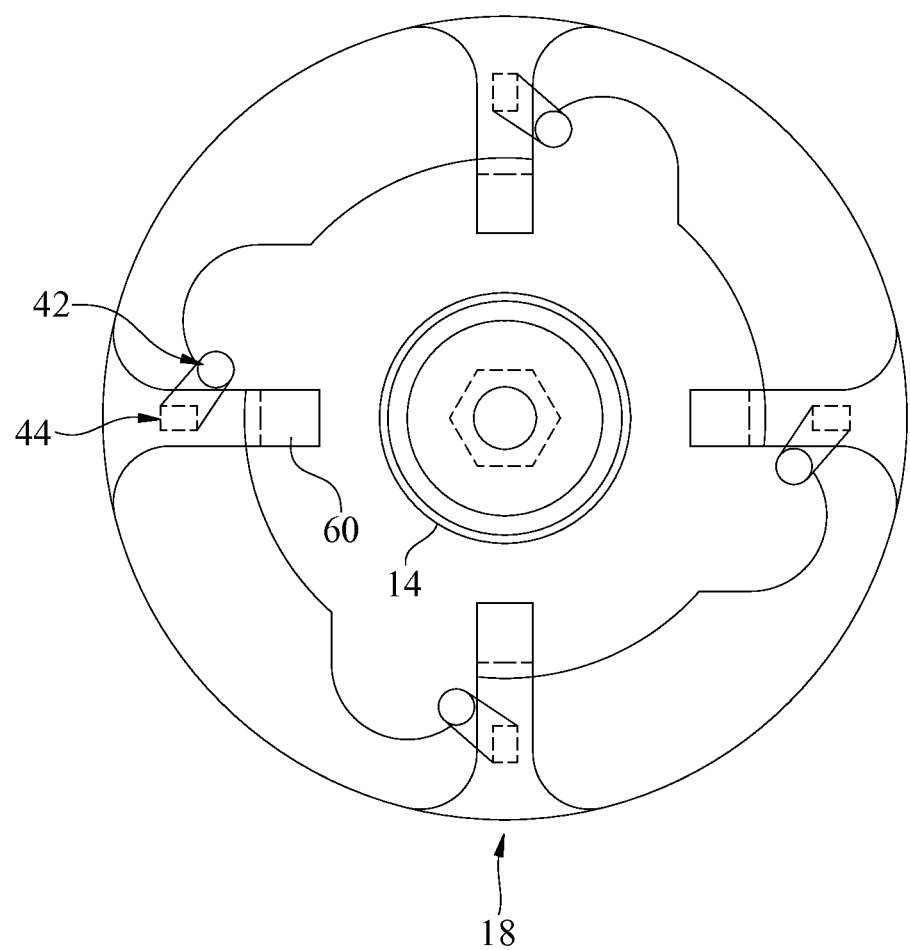
FIG. 9 is a top view of the rotary head assembly of FIG. 8.
Figure 10:
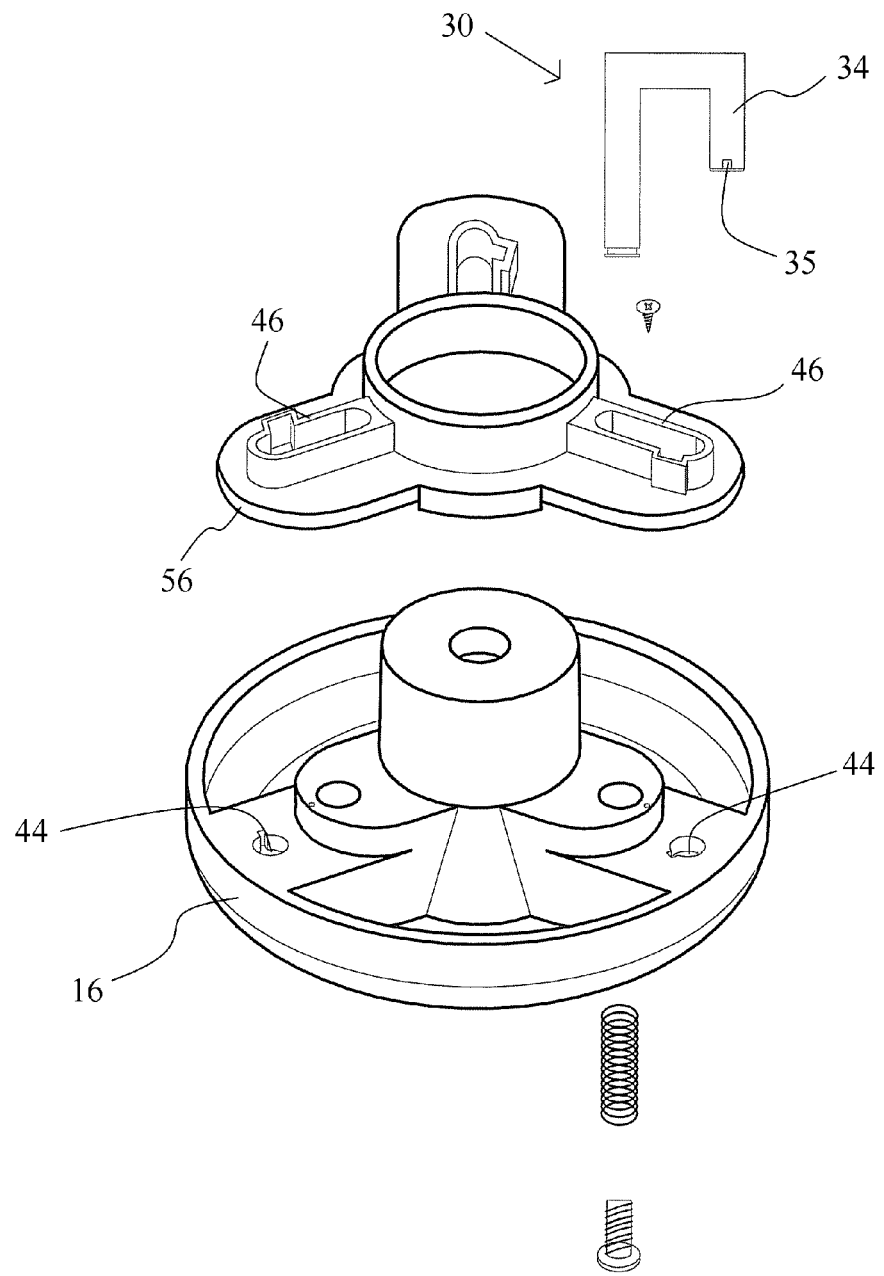
FIG. 10 is an exploded, elevated view in perspective of another embodiment of this invention.

Another aspect of the present invention is shown in FIGS. 8 and 9, wherein the rotary head assembly 10 is configured to be attached to conventional trimming devices through the use of an attachment member such as a bolt or threaded screw (not shown) through the central member aperture 12 formed by the central member 14 of the rotary head assembly. The rotary head assembly 10, as illustrated in FIGS. 8 and 9, comprises a rotary head housing 16 defining one or more slots 18, each of the slots being intersected by at least a portion of a second retention member chamber portion 44 defined by the rotary head housing, and each of the slots being sized and configured to receive a respective retained member 22. The rotary head housing 16 in this illustrated aspect defines a plurality of retention member chambers 20, wherein each retention member chamber includes a first retention member chamber portion 42 and the second retention member chamber portion 44. The second retention member chamber portion 44 intersects the slot 18 whereas the first retention member chamber portion 42 may be adjacent to the slot. In the illustrated aspect of FIGS. 8 and 9, the retention member 30 is a J-shaped retention member wherein the cross-sectional view of the second retention member portion 34 is square-shaped. The retained member 22 in such an aspect may be a trimmer line. The square-shaped second retention member portion configured to retain the trimmer line such that the trimmer line will be securely held in the slot and extend distally from the rotary head assembly. The rotary head housing 16 further defines a plurality of grooves 60, each groove forming a passageway from each slot 18 to the second face 26 of the rotary head assembly 10 wherein the trimmer line 22 may be inserted or removed without actuating the retention member 30.

To operate an aspect of the present invention, a method is provided for removing one or more retained members 22 from the rotary head assembly 10 of FIG. 1. The rotary head assembly 10 is configured for attachment to a rotary power source (not shown) through the use of an attachment member such as a bolt or threaded screw (not shown) through the central member aperture 12 formed by the central member 14 of the rotary head assembly 10. The rotary head assembly 10 includes a rotary head housing 16 defining one or more slots 18 each being sized and configured to receive a respective one of the retained members 22 and being intersected by at least a portion of a retention member chamber 20 defined by the rotary head housing 16.

The method in this aspect includes applying an actuating external force to a first retention member end portion 32 of the J-shaped retention member 30. The first retention member end portion 32 and at least a portion of a second retention member portion 34 of the J-shaped retention member 30 are biased by a spring 36 prior to application of the actuating external force such that the first retention member end portion is external to the retention member chamber 20 and the second retention member portion retains the retained member 22 in the slot. It should be appreciated that multiple retained members may be contemplated, including those illustrative retained members shown in FIGS. 1 and 3. Upon application of the actuating external force, typically provided for by the operator of the trimming device, the bias of the spring 36 is overcome. As the bias of the spring 36 is overcome, the second retention member portion 34 is removed from the slot 18, and after the retention member 30 is removed from the slot, the retained member 22 may be removed from the rotary head assembly 10.

Figure 11:
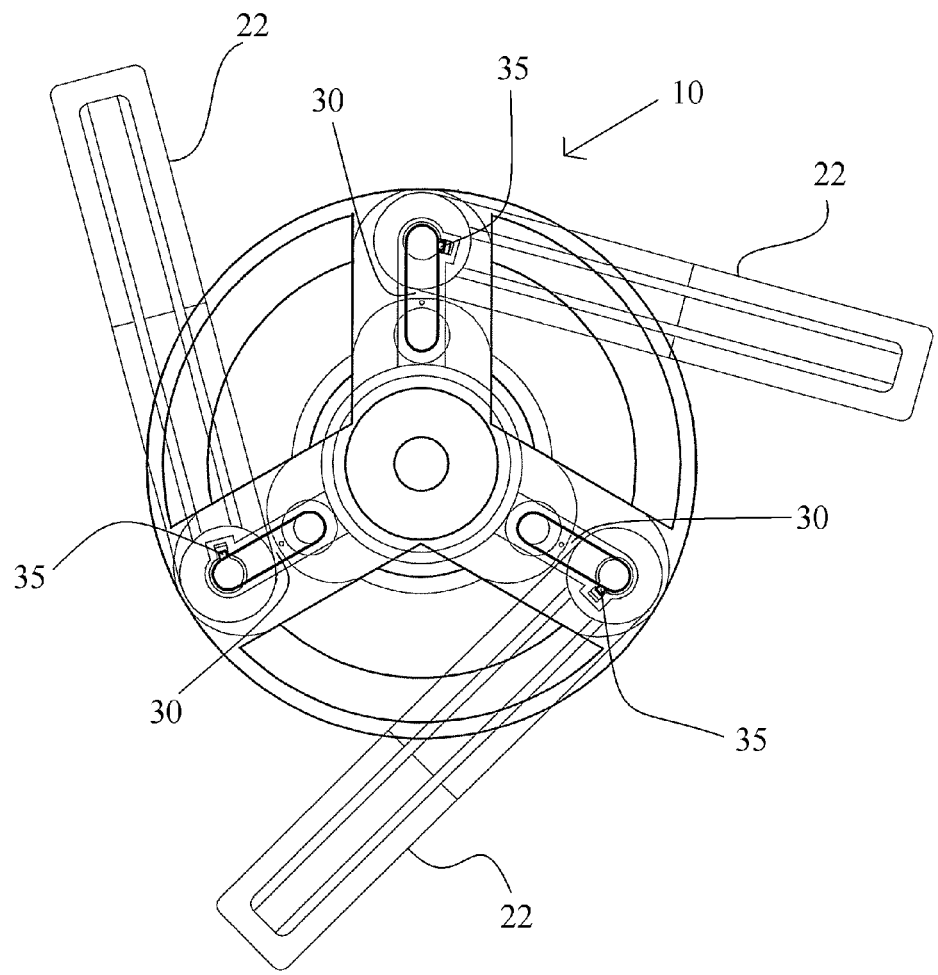
FIG. 11 is a top plan view of the apparatus of FIG. 10 onto which are installed three retained members in the form of cutting blades.
Figure 12:
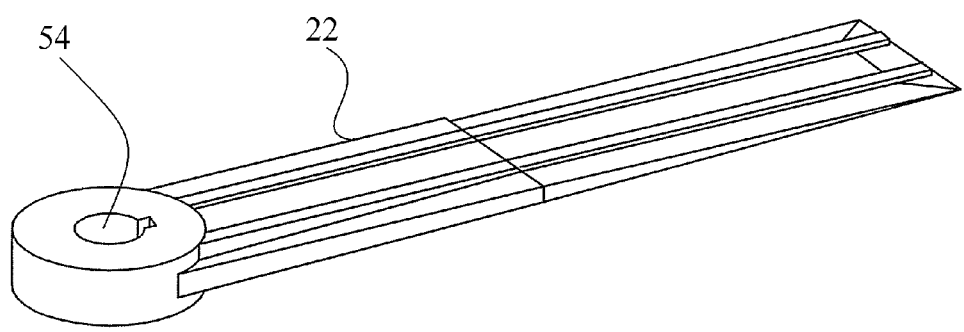
FIG. 12 is an elevated view in perspective of one of the cutting blades of FIG. 11.
Figure 13:
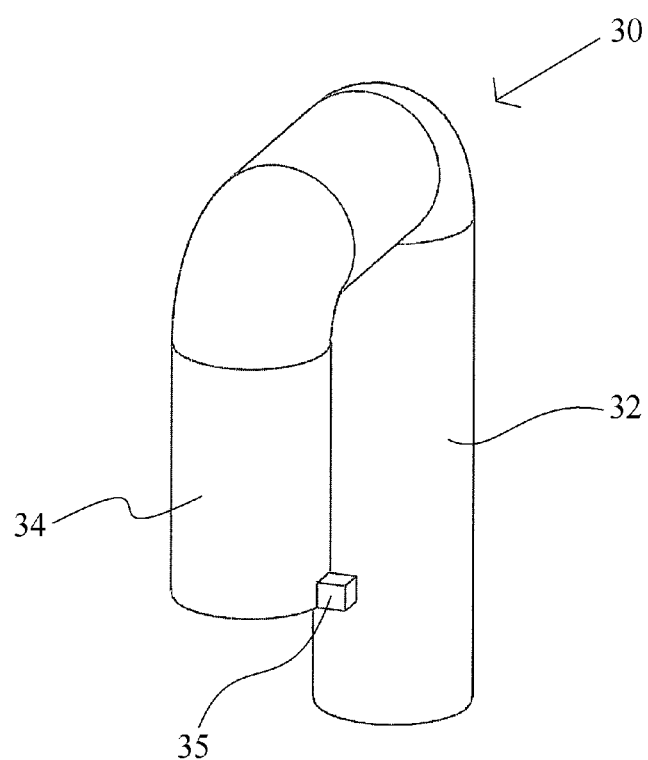
FIG. 13 is a view in perspective of one of the retention members of the device of FIG. 10.

Another specific aspect of one embodiment of this invention is illustrated in the accompany FIGS. 5, 6 and 10-13. There it can be seen that the embodiment illustrated provides a key-and-lock mating between the second retention member portion 34 and an aperture 54 in each of the retained members 22. In particular, at least a portion of the second retention member portion 34 is geometrically shaped, and aperture 54 defined by each of the retained members 22 is defined in a geometrical mating fashion relative to the geometrically shaped second retention member portion 34, so that the second retention member portion 34 is removed from the aperture 54 defined by the retained member 22 (see especially FIG. 12) through which the second retention member portion 34 extends, only when the second retention member portion 34 is in key-and-lock style geometric alignment with the specific contours of aperture 54. This would, of course, exclude a symmetrical, cylindrical second retention member portion mated to a simple cylindrical aperture, since there would be no lock-and-key style interface between the second retention member portion and the aperture in such case. As illustrated, the key-like shape is provided to the second retention member portion 34 using a flange or other protrusion 35 (see especially FIG. 13) extending laterally from a side wall of second retention member portion 34. Of course, a wide variety of other shapes and physical arrangements, indentations and the like around the surface of second retention member portion 34 can now be imagined by those of skill in the art having the benefit of this disclosure, in order to provide a key-like shape. As illustrated, aperture 54 in the retained member 22 is likewise shaped to matingly receive this shaped portion of second retention member portion 34, only when the retained member 22 is disposed so that retained member aperture 54 aligns with the second retention member portion 34 geometrically, such alignment position being substantially offset (as seen from FIG. 11) from the normal, laterally extended disposition of the retained member during operational rotation of retained member 22 with rotary assembly 10. FIG. 11 depicts the rotary assembly 10 in a non-operational state, whereby retained members 22 can be manually aligned with respective second retention member portions 34 for removal from assembly 10. Likewise, as can be seen by reference to FIGS. 10 and 11, rotary head housing 16, cover member 56, second retention member chamber portion 44, and sidewalls 46 may likewise be contoured to accommodate the particular geometry of second retention member portion 34. Upon manual biasing of the retention member 30 during alignment of second retention member portion 34 and aperture 54, the second retention member portion 34 can be disengaged from the retained member 22 by removal through the shaped aperture 54. The particular geometric shape of the second retention member portion 34 is immaterial, as long as the shape employed provides the function described. In some embodiments, it may be preferred that the geometry employed be selected such that only rotation of the retained member 22 by hand into a proper geometric alignment is possible or practical, thereby reducing further the possible passive rotation of the retained member 22 into a second retention member portion—retained member aperture aligned position. This is accomplished, for instance, in the embodiment illustrated at FIGS. 10 and 11 by placing the flange or protrusion 35 so that it extends inwardly towards the axis of rotation of the assembly, so that it would be highly unlikely, if not impossible, for an unintentional alignment of the second retention member portion 34 with the retained member aperture 54 during rotational operation of the apparatus. Of course, other alternative key-to-keyhole geometric alignments may be employed for a given application. Generally speaking, this feature provides enhances safety, as it reduces significantly any possibility of the inadvertent or unintentional disconnection of the retained member 22 from the rotary head assembly during rotational operation of the apparatus.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

The foregoing illustrations of course are not intended to limit the scope of this invention, which is susceptible to considerable variation within the spirit and scope of the appended claims.

The invention claimed is:

1. An apparatus comprising
a rotary head assembly configured for attachment to a rotary power source, the rotary head assembly comprising
a rotary head housing defining
one or more slots, each of the slots being intersected by at least a portion of a respective retention member chamber defined by the rotary head housing, and each of the slots being sized and configured to receive a respective retained member;
a first face and a second face, wherein the first face and the respective retention member chamber define a respective first face aperture;
one or more retention members, each comprising a first retention member portion and a second retention member portion, wherein the second retention member portion is sized and configured such that at least a portion of the second retention member portion may be disposed within a respective retention member chamber; and
one or more biasing members, each biasing member and a respective one of the retention members being coupled to the rotary head housing and each biasing member biasing the respective retention member so that (i) the first retention member portion extends through the respective first face aperture and is external of the respective retention member chamber such that the first retention member portion is accessible to manipulation by an actuating external force and (ii) the second retention member portion thereof in the respective retention member chamber intersects and extends through a respective one of the slots, thereby retaining a portion of the retained member within the respective slot;
wherein each retention member and respective biasing member are sized and configured so that, when the actuating external force is applied to the first retention member portion, the retention member is actuated causing a bias of the biasing member to be overcome and the second retention member portion to be removed from the respective slot, thereby releasing the respective retained member from the respective slot;
wherein at least a portion of the second retention member portion is geometrically shaped, and an aperture defined by the retained member is defined in a geometrical mating fashion relative to the geometrically shaped second retention member portion, so that the second retention member portion is removed from the aperture defined by the retained member through which the second retention member portion extends only when the second retention member portion is in key-and-lock style geometric alignment with the aperture defined by the retained member; and wherein each of the one or more retention members forms a J-shaped retention member, a straight portion of the retention member forming the first retention member portion and at least a portion of a curved portion of the J-shaped retention member forming the second retention member portion.

2. The apparatus of claim 1 wherein the retention member chamber defined by the rotary head housing comprises a first retention member chamber portion and a second retention member chamber portion and the rotary head housing further defines a sidewall at least semi-encircling the first face aperture, a top portion of the sidewall extending further from the first face than the first retention member portion when biased by the biasing member.

3. The apparatus of claim 1 wherein the first retention member portion comprises a first retention member head portion coupled to a first retention member shaft portion.

4. The apparatus of claim 3 wherein the retention member is disposed within the retention member chamber such that the first retention member shaft portion extends through the first retention member chamber portion, the first face aperture, and the biasing member and is further coupled to the first retention member head portion such that the biasing member and the retention member are coupled to the rotary head housing.

5. The apparatus of claim 4 wherein the biasing member is a spring.

6. The apparatus of claim 2 wherein the second retention member chamber portion intersects the respective slot.

7. The apparatus of claim 6 wherein the first retention member chamber portion and the second retention member chamber portion each intersect the respective slot.

8. The apparatus of claim 1 wherein the first retention member portion comprises a first retention member head portion coupled to a first retention member shaft portion.

9. The apparatus of claim 3 wherein the diameter of the second retention member portion is greater than the diameter of the first retention member shaft portion.

10. The apparatus of claim 1 wherein the portion of the curved portion of the J-shaped retention member forming the second retention member portion forms a square-shaped cross section.

11. The apparatus of claim 10 wherein the retained member is a trimmer line, wherein the trimmer line is inserted into the respective slot and wrapped around and retained by the retention member, the end portions of the trimmer line extending distally from the respective slot.

12. The apparatus of claim 1 wherein the retained member defines a retained member aperture sized and configured to accept the second retention member portion therethrough, such that the retained member is retained by the retention member.

13. The apparatus of claim 12 wherein the retained member is selected from the group consisting of a trimmer line holder, a broom apparatus, a mixer blade, a blower blade, and a propeller blade.

14. The apparatus of claim 13 wherein the trimmer line holder defines one or more recesses and a respective slot opening, wherein the trimmer line holder comprises a hook member disposed within the respective recess, the hook member capable of retaining a trimmer line when the trimmer line as folded is wrapped around the hook member and the remainder of the trimmer line extending through the respective slot opening and distally from the trimmer line holder.

* * * * *